March 11, 1952     E. A. FONTAINE     2,588,974
OPTICAL ALIGNER
Filed March 7, 1950     3 Sheets-Sheet 1
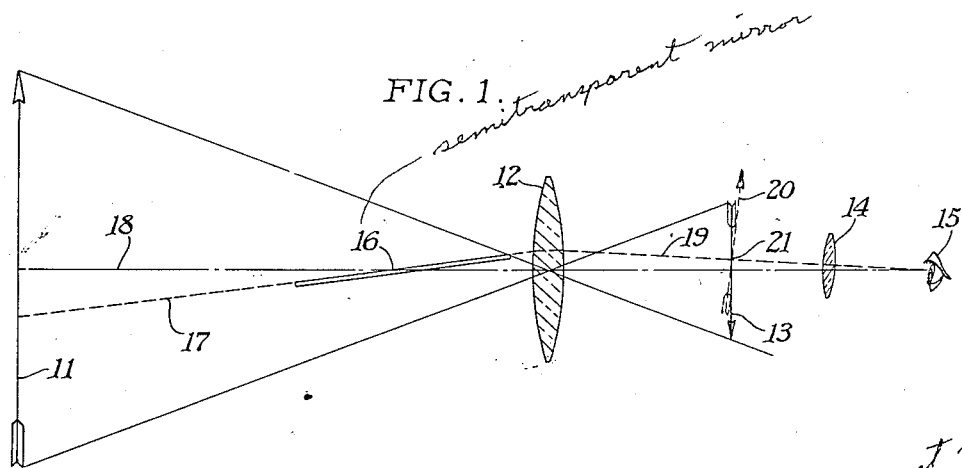
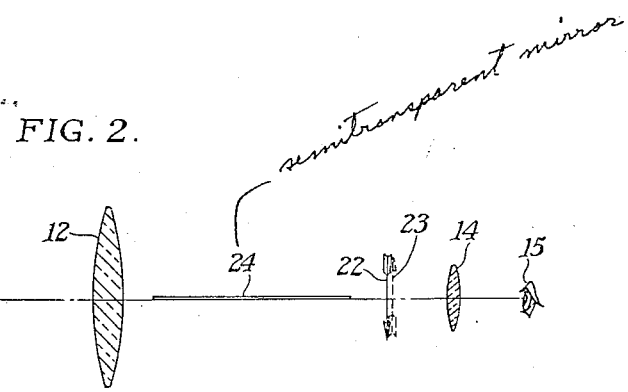
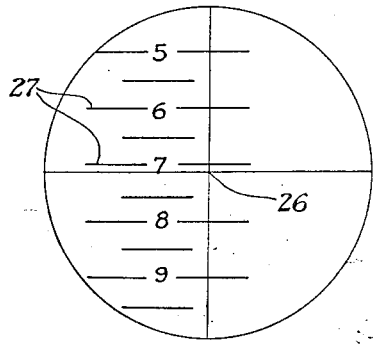
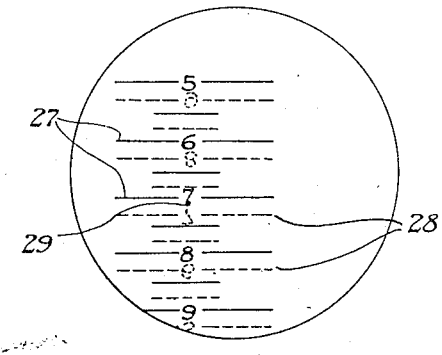
EMILE A. FONTAINE
INVENTOR March 11, 1952  E. A. FONTAINE  2,588,974
OPTICAL ALIGNER
Filed March 7, 1950  3 Sheets-Sheet 2

EMILE A. FONTAINE
INVENTOR

March 11, 1952     E. A. FONTAINE     2,588,974
OPTICAL ALIGNER

Filed March 7, 1950     3 Sheets-Sheet 3

EMILE A. FONTAINE
INVENTOR

UNITED STATES PATENT OFFICE 2,588,974

OPTICAL ALIGNER

Emile A. Fontaine, Gethsemane, Ky., assignor to Eastman Kodak Company, Rochester, N. Y., a corporation of New Jersey Application March 7, 1950, Serial No. 148,237

17 Claims. (Cl. 88—14)

This invention relates to optical aligners which are instruments for accurately determining a straight line and for aligning two or more objects or parts of an object. For example, the device can be used for testing the straightness of bars such as used on optical benches or long "ways" of a planer or other machine tool.

It is the object of the present invention to provide an aligner which will align in both horizontal and vertical planes, or more generally will align in two azimuths at right angles to the line of sight. In one preferred embodiment of the invention the alignment in both planes is made simultaneously and in another embodiment alignments in any azimuth can be made in quick succession.

It is a particular object of the invention to provide an aligner of very high accuracy which is simple to use and which remains in adjustment under normal working conditions.

It is an object of certain embodiments of the invention to provide an aligner which can be quickly aimed approximately, and then in which the fine adjustment is simple and convenient to make.

According to the invention, this optical aligner consists essentially of an objective, either a lens or a concave mirror for forming an image of a test object which may be either the item whose alignment is being checked or a simple scale member temporarily attached to or resting on the item. Located optically between the object and image, or at least between the object and the eyepiece used for viewing the image, there is one or preferably two semi-transmitting mirror surfaces approximately on the optic axis of the objective or at least pointing toward the paraxial part of the objective. In the two mirror embodiment, the fact that both are on or near the optic axis means that the line of intersection or dihedral edge formed by the two mirrors is coincident with or approximately coincident with the optic axis. Preferably the mirror surface or surfaces are formed in a transparent solid member which has plano parallel entrance and exit faces substantially orthogonal to the optic axis and to the one or two semi-transparent mirrors. The solid transparent member may be in front of the objective if it is a lens or in front of the concave mirror if it is far enough in front so that the image forming rays reflected from the mirror do not pass again through the solid member before being deflected to the viewing means. However, either of these cases would require the solid member to be quite large and therefore preferably, the solid member is placed near the image plane either at it or immediately in front of it or immediately behind it. When a concave spherical reflector is used for the objective, the spherical aberration thereof may be corrected by a simple lens element such as the figured Schmidt plate or a concentric meniscus element, either of which systems are known. A plane reflector is in this case located between the lens element and the concave reflector for receiving light from the latter and for reflecting it again to form the image preferably (for convenience in viewing and to avoid having to perforate the mirror) at one side of the main light beam coming from the object through the lens element to the concave reflector. The viewing means may be either a simple eyepiece or a microscope positioned to receive light from the image. It is convenient in this case to have the transparent solid member with its semi-reflecting surface or surfaces also located at one side of the light beam and near the image formed by the concave reflector and the plane reflector.

The semi-transparent mirror constitutes an aligning plane and in the two mirror case, the line of intersection of the two mirrors constitutes the aligning axis of the instrument. This axis or plane is not affected in any way by the objective if it coincides with the optic axis of the objective. If, however, the aligning plane or axis is not exactly coincident with the optic axis of the objective, it is merely refracted or reflected in the same way as a ray of light and it still defines a definite and reliable plane or axis on the other side of the objective. Thus it does not matter whether the intersecting semi-transparent mirrors are in the object space optically on one side of the objective or in the image space, optically on the other side of the objective.

The instrument could be provided with adjusting screws to tilt the whole instrument for accurate aiming, but it is more convenient to aim the device approximately and then to provide the fine adjustment by means of some simple light deviating device built into the instrument. Preferably the light deviator is a plano parallel plate mounted in gimbals to be rotatably adjustable about two axes at right angles to each other and approximately at right angles to the optic axis of the objective.

When a concave reflector is used with a small mirror for reflecting the image to one side of the main beam, this small mirror obscures the center of the main beam coming from the object to the concave mirror. This is not objectionable providing the effective diameter of the small plane mirror is kept to a minimum. A preferable embodiment of the invention takes into account the fact that this center portion of the beam is lost anyway, and employs another small reflector in front of the plane reflector for receiving light directly from the object and directing it to one side of the beam to form a view finder or preliminary aiming device. A low-power telescope can be used in this small beam and the reflector is preferably in the form of a dove prism so that aiming of the device in accordance with the image seen in the auxiliary telescope will be "with" rather than "against" the image movement.

Other objects and advantages of the invention will be apparent from the following description when read in connection with the accompanying drawings in which:

Figs. 1 and 2 are schematic to illustrate the principle of the invention.

Figs. 3 and 4 respectively show the field of view of an ordinary aiming device and the system shown in either Fig. 1 or Fig. 2.

Figs. 5 and 6 show optical units for quadrupling the image according to a preferred embodiment of the invention.

Figs. 7 and 8 respectively show the field of view in an ordinary aiming device and one employing either the unit shown in Fig. 5 or that shown in Fig. 6.

Figure 5:
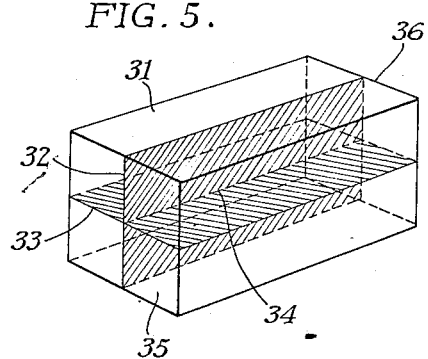

The operation of the single plane embodiment of the invention is first considered for simplicity. In Fig. 1 light from an object 11 is brought to focus by an objective 12 to form an image 13 which is viewed through an eyepiece 14 by the eye 15 of an observer. Between the object and the viewing means, and in this Fig. 1 specifically between the object and the objective, is a semi-transparent mirror 16 lying approximately on the optic axis 18 of the objective 12. At least it is pointing toward the paraxial region of the objective 12. The semi-transparent mirror 16 is shown at a slight angle to the optic axis 18 for the sake of generality in explaining the principal of the invention. In practice it is placed substantially on the optic axis. This mirror 16 provides an aiming plane 17 extending all the way to the object and also extending into the image space, but, as shown at 19 this aiming plane is effectively refracted by the objective 12. The image of the object as reflected by the semi-transparent mirror 16 and then focused by the objective 12 is shown in broken lines 20. The point 21 where these two images intercept corresponds to a point on the object 11 and thus the eye 15 sees exactly the point on the object 11 toward which the aiming axis (a plane in this case) is pointed. The plane 17 is so near the axis 18, in practice, that curvature of the plane 19 is negligible.

As shown in Fig. 2 the semi-transparent mirror 24 may be placed in the image space. In this Fig. 2 the mirror is placed accurately on the optic axis and the two images 22 and 23 of the object are superimposed. Again, the parts of the two images which are accurately in register represent the aiming plane of the instrument.

If one views a scale through an ordinary aiming telescope the image thereof such as shown at 27 in Fig. 3 is matched with the point 26 of the cross hairs of the instrument. This depends on the accuracy of the cross hair adjustment and many other well known factors. In the present device, however, the cross hairs are, or at least may be, eliminated, and the field of view is that shown in Fig. 4. Not only is the image 27 of the scale produced but also a reflected image 28, inverted with respect to the image 27, appears in the field. The plane where these two images register is the aiming plane of the instrument and is shown at 29 in Fig. 4. This plane may be anywhere in the field of view.

The single plane embodiment of the invention operates on this simple principle and aligns relative to a plane. Such a device is adequate in some instances such as when one is merely testing the levelness of a surface. However, such a restricted field of application is a disadvantage. In the single plane form, I therefore prefer to mount the semi-transparent mirror rotatable about the optic axis of the objective. This permits the azimuth of alignment to be selected at will and alignments checked in different planes, in quick succession. The single plane thus rotatable has an advantage over the two plane system described below in that confusion of complex images is a minimum.

Figure 6:
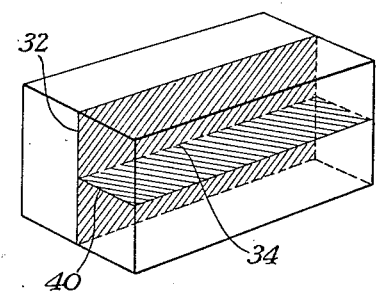

However, to provide a single axis instead of a plane, the preferred embodiment of the present invention employs two semi-transparent reflecting surfaces substantially at right angles to each other, but they may be at any angle preferably a sub multiple of 180° to reduce confusion of the resulting image. In Fig. 5 the two semi-transparent surfaces 32 and 33 have their dihedral edge or line of intersection 34 running longitudinally through a block 31 of transparent material. The entrance and exit faces 35 and 36 of this block are preferably plano parallel. As shown in Fig. 6 one of the semi-transparent surfaces need not extend on both sides of the other but, as shown at 40, may be merely in one half of the device. When these blocks are substituted for the single mirror in either Fig. 1 or Fig. 2, the aiming plane becomes a single aiming axis constituted by the line of intersection of the two semi-transparent mirrors.

Figure 7:
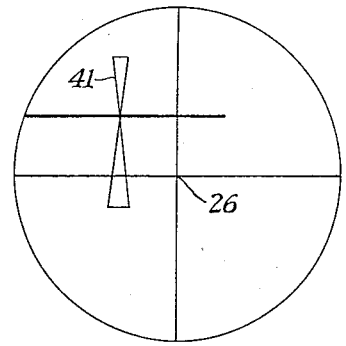
Figure 8:
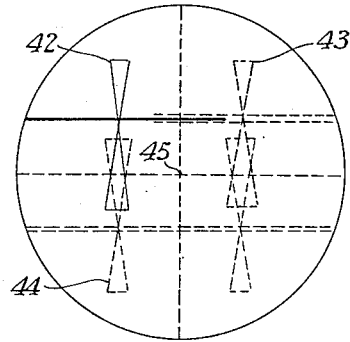

Fig. 7 again shows the view in an ordinary aiming telescope in which the cross hairs 26 are to be matched with the image 41 of a simple star object. According to the invention, the double mirror block provides doubling of the image in both directions as shown in Fig. 8. In addition to the direct image 42, the observer sees two images 43 and 44, one inverted and the other laterally inverted relative to the image 42. A fourth, perhaps somewhat fainter image, is usually seen in the fourth quadrant of the system, but this is not necessary to the operation of the device. The point 45 which corresponds to the intersection of the two semi-transparent mirrors represents the aiming axis of the instrument. In operation of the device, either the instrument itself is adjusted or the object under test is adjusted until the desired point of the image shows on this point 45. For example, if the center of the star image 42 were moved toward the point 45 the center of each of the other images would move toward this point and all would arrive there simultaneously, which provides very accurate and convenient aiming, without cross hairs and their attendant inaccuracies.

Figure 9:
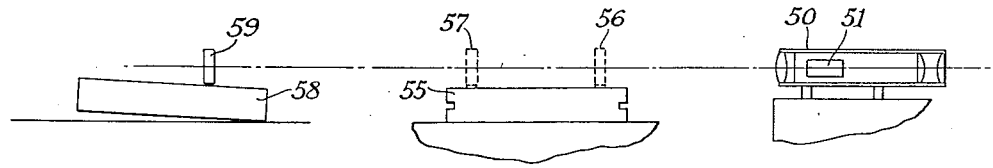
Fig. 9 is a schematic illustration of the operation of an aligner in a practical problem.

Fig. 9 is included merely to illustrate one operation using an aligner. In this case an aligning instrument 50 provided with the quadrupling block 51 is positioned on some suitable support to one side of a pair of objects which are to be accurately aligned. The standard or basic object 55 is first tested to be sure that the instrument 50 is aligned therewith. A simple target or scale is positioned at the point 56 on the standard 55 and the instrument 50 is adjusted transversely until the image of a point on the object 56 is "centered," i. e. until the four images of this point are in register. The test target is then moved to the point 57 and the aligner is again adjusted, this time only rotationally about position 56 until the image point is again "centered." It is sometimes customary to move the test target back to the point 56 to be sure that both points stay in alignment with respect to the aligner 50. The test target is then moved to the point 59 on an object 58 which is to be aligned with the object 55 and the object 58 is adjusted in its position, until the image of the desired point on the test target 59 is "centered." This may be repeated for several positions of the test target on the object 58.

For example, it is sometimes desirable to provide extreme accuracy on large planers having long planing ways 20 or 30 feet long with a deviation from exact flatness less than one-thousandth of an inch. In this case, the aligner is set up at one end of the long planing ways and the test object is checked at successive points therealong. More common uses of aligners include sextants, gunsights, theodolites and the like. The present invention is useful in any type of aligner where high accuracy is desirable.

Figure 10:
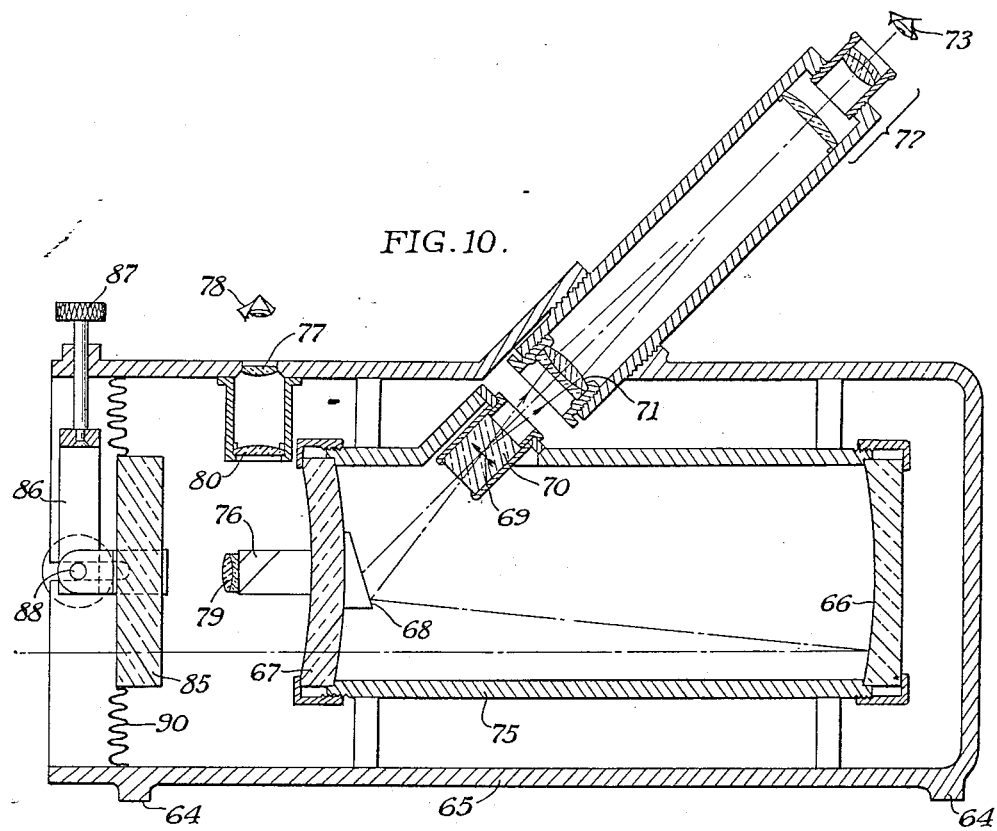
Fig. 10 shows a vertical cross section of a preferred form of an aligner according to the present invention.

In Fig. 10, a highly accurate and practical form of aligner incorporating the present invention is shown. In this figure the instrument is provided with a double housing to eliminate dust and the effect of temperature changes. The outside housing 65 carries the inner housing 75 on heat insulating supports. The studs or legs 64 on the outer housing are preferably of glass or carboloy lapped to flatness or a knife edge. A concave reflector 66 receives light through a concentric meniscus element 67 which corrects the spherical aberration of the reflection 66 in known manner. The light from the object is focused by the mirror 66 onto a small, axially located, plane reflector 68 and thence to form an image 69 at one side of the main beam of light from the object. According to the invention a quadrupling plate or member 70 is positioned at the image 69 and this image is observed through a compound microscope made up of objectives 71 and eyepiece 72, by the eye 73 of an observer.

The instrument is conveniently aimed by positioning the eye at the point 78 to receive light from the object reflected by a dove prism 76. This small auxiliary beam is provided with a low power telescope consisting of an objective 79, a field lens 80 with reticle and an eyepiece 77 located in an aperture in the housing of the instrument. This auxiliary telescope covers a relatively wide field of view and is used merely for approximately preliminary aiming so that the test object whose image falls on the reticle 80 is also the one whose greatly enlarged image is formed at the point 69.

Since the instrument is particularly sensitive to adjustment, as it must be if it is to be used for precision aligning, it is difficult to adjust the alignment by crude motion of the whole instrument. Therefore, after it has been approximately aimed, by means of the auxiliary telescope, further fine adjustments are made by tilting a plano parallel glass plate 85. This plate is mounted in gimbals 86 so that it may be rotated about a vertical axis by rotation of a knob 87 or about a horizonal axis by rotation of a knob 88. As is well known, rotation of a thick glass plate in a slightly diverging light beam provides fine adjustment of the beam. When the object is at a great distance and the light beam therefrom is nearly collimated, the effect of turning the plate is very small as far as image motion is concerned. However the sensitivity "at the object" is constant, so that any given error in object position requires the same degree of plate tilting for resetting the instrument, no matter how far the object is away. The invention is not limited to the particular form of light deviating mechanism which is used since any of those common to rangefinders for example are suitable, but the tilting plate is perhaps the easiest to use in a system requiring deviation in two azimuths. A resilient wall 90 is provided between the tilting plate and the housing 65 to allow the plate 85 to tilt but to maintain the interior of the instrument dust proof. A simple window accurately made could be provided immediately behind the tilting plate but this would be somewhat more expensive.

Figures 11, 12:
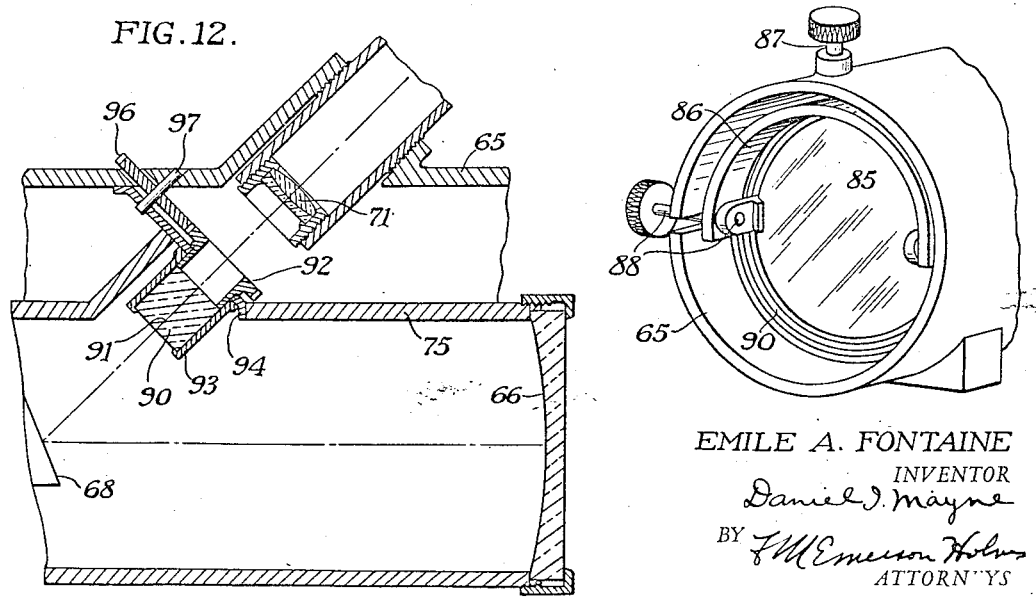
Fig. 11 is a perspective view of one detail of the instrument shown in Fig. 10.
Fig. 12 shows a detail which is alternative to one shown in Fig. 11 and which constitutes the distinctive feature of another embodiment of the invention.

Fig. 12 shows a modification in which the quadrupling block 70 of Fig. 10 is replaced by a simple doubling block 90 having a single semi-transparent surface 91 lying on the optic axis of the mirror 66 as reflected by the plane mirror 68. The block 90 is carried by a ring 92 and clamp tube 93 which are rotatable in a ring carried by the housing 75. The ring 92 is a spur gear engaging a similar gear 96 rotatable on a pin 97 through the outer housing 65 of the instrument. The gears 92 and 96 are held under a certain amount of pressure but are rotatable simply by turning the gear 96 by finger. The rotatable single plane embodiment provides means for doubling the image in two azimuths at right angles in quick succession and the quadrupling embodiment provides such means operating simultaneously. The remainder of the device is identical with that shown in Fig. 10. Even a quadrupling block such as 70 may be rotatably mounted in place of the block 90. The advantage is that some targets are more easily (i. e. with less confusion) observed at some angles than at others. Thus the block 90 may be either a doubling or quadrupling one. Of course most applications requiring the extreme precision of alignment obtainable with the present invention involve simple targets such as a point or a scale selected at will and the question of confused images does not come up.

I claim as my invention:

1. An optical aligner comprising an objective for forming an image of a test object, means for viewing the image and, optically between the objective and the viewing means, semi-transparent plane reflector means substantially on and along the optic axis of the objective for doubling the image in two azimuths and for superimposing the two images in each azimuth.

2. An optical aligner according to claim 1 in which said semi-transparent reflector means is a single plane one and in which a mount is provided for the semi-transparent reflector means rotatable about the optic axis of the objective.

3. An optical aligner according to claim 1 in which said semi-transparent reflector means consists of two plane semi-transparent reflectors substantially at right angles with the line of intersection substantially coincident with said optic axis.

4. An optical aligner comprising an objective for forming an image of a test object and, optically between the object and image, two semi-transmitting plane mirror surfaces approximately at right angles to each other with the dihedral edge pointing toward the paraxial part of the objective.

5. An optical aligner comprising an objective for forming an image of a test object and, optically between the object and image, a transparent solid member with plano parallel entrance and exit faces and with two intersectiing internal semi-transparent plane mirror surfaces with the line of intersection orthogonal to the entrance and exit faces and pointing toward the paraxial part of the objective.

6. An optical aligner comprising an objective for forming an image of a test object, means for viewing the image and, optically between the object and the viewing means, two semi-transmitting plane mirror surfaces approximately at right angles to each other with the dihedral edge pointing toward the paraxial part of the objective.

7. An optical aligner comprising an objective for forming an image of a test object, means for viewing the image and, optically between the object and the viewing means, a transparent solid member with plano parallel entrance and exit faces and with two intersecting, internal, semi-transparent, plane mirror surfaces with the line of intersection orthogonal to said entrance and exit faces and pointing toward the paraxial part of the objective.

8. An optical aligner according to claim 7 in which said line of intersection is substantially on the optic axis of the objective.

9. An optical aligner according to claim 7 in which said transparent member is substantially at said image.

10. An optical aligner according to claim 7 in which said objective comprises a concave reflector.

11. An optical aligner according to claim 7 in which said objective comprises a concave spherical reflector, a lens element between the object and the concave reflector for correcting the aberrations of the latter, a plane reflector axially between said lens element and the concave reflector for receiving light reflected by the latter and for reflecting it again and to said viewing means located at one side of the light beam from the object to the concave reflector.

12. An optical aligner according to claim 11 in which the transparent solid member is between said plane reflector and the viewing means.

13. An optical aligner according to claim 7 including, optically between the object and the transparent solid member, a plano-parallel transparent plate rotatably adjustable about two axes at right angles to each other and to the optic axis of the objective.

14. An optical aligner comprising a concave spherical reflector for forming an image of a test object, a lens element between the object and the concave reflector for correcting the spherical aberration of the latter, a plane reflector axially between the lens element and the concave reflector for receiving the light reflected by the latter and for reflecting it again to form said image at one side of the beam of light from the object to the concave reflector, a transparent solid member, approximately at said image, with plano-parallel entrance and exit faces and with two intersecting, internal, semi-transparent, plane mirror surfaces with the line of intersection substantially on the optic axis of the concave reflector as reflected by the plane reflector, and a microscope for viewing the image.

15. An optical aligner according to claim 14, including, between the object and the lens element, a plano-parallel transparent plate rotatably adjustable about two axes at right angles to each other and to the optic axis of the concave reflector and lens element.

16. An optical aligner according to claim 14, including a third reflector, smaller in effective diameter than said plane reflector, between the latter and the object for reflecting a small beam of light from the object to one side and a telescope, of wider field than the concave-reflector-lens-element system, in said small beam for view finding and approximate aiming of the aligner.

17. An optical aligner comprising a concave spherical reflector for forming an image of a test object, a lens element between the object and the concave reflector for correcting the spherical aberration of the latter, a plane reflector axially between the lens element and the concave reflector for receiving the light reflected by the latter and for reflecting it again to form said image at one side of the beam of light from the object to the concave reflector, a transparent solid member, approximately at said image, with plano-parallel entrance and exit faces and with internal, semi-transparent, plane mirror means for doubling the image in two azimuths substantially on the optic axis of the concave reflector as reflected by the plane reflector, and a microscope for viewing the image.

EMILE A. FONTAINE.

REFERENCES CITED

The following references are of record in the file of this patent:

UNITED STATES PATENTS

| Number | Name | Date |
|---|---|---|
| 575,202 | Bedell | Jan. 12, 1897 |
| 1,501,979 | Willson | July 22, 1924 |
| 1,531,693 | Douglass | Mar. 31, 1925 |
| 1,755,036 | Sussman | Apr. 15, 1930 |
| 2,194,059 | Valentine | Mar. 19, 1940 |

FOREIGN PATENTS

| Number | Country | Date |
|---|---|---|
| 48,010 | Germany | Aug. 2, 1889 |
| 366,290 | Germany | Jan. 5, 1923 |